(12) United States Patent
Park et al.

(10) Patent No.: US 8,531,387 B2
(45) Date of Patent: Sep. 10, 2013

(54) DISPLAY DEVICE

(75) Inventors: Sangtae Park, Pyeongtaek-si (KR);
Minchul Kim, Pyeongtaek-si (KR);
Sungwoo Kim, Pyeongtaek-si (KR);
Bupsung Jung, Pyeongtaek-si (KR);
Buwan Seo, Pyeongtaek-si (KR);
Myounghwa Ko, Pyeongtaek-si (KR);
Seungchoon Bae, Pyeongtaek-si (KR);
Soonhyung Kwon, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 132 days.

(21) Appl. No.: 13/100,950

(22) Filed: May 4, 2011

(65) Prior Publication Data

US 2011/0205256 A1  Aug. 25, 2011

Related U.S. Application Data

(63) Continuation of application No. 12/796,130, filed on Jun. 8, 2010, now abandoned.

(60) Provisional application No. 61/237,587, filed on Aug. 27, 2008.

(30) Foreign Application Priority Data

Nov. 24, 2009 (KR) .................. 10-2009-0113711

(51) Int. Cl.
*G09G 3/36* (2006.01)

(52) U.S. Cl.
USPC ............................................. 345/102; 349/61

(58) Field of Classification Search
USPC ............... 345/87–104, 204, 690; 349/61–71
See application file for complete search history.

(56) References Cited

U.S. PATENT DOCUMENTS

| | | | |
|---|---|---|---|
| 2001/0035850 A1* | 11/2001 | Okamoto et al. | 345/77 |
| 2003/0123002 A1* | 7/2003 | Kawase | 349/113 |
| 2005/0083296 A1 | 4/2005 | Daly | |
| 2005/0237292 A1 | 10/2005 | Kim et al. | |
| 2006/0214904 A1 | 9/2006 | Kimura et al. | |
| 2007/0109252 A1 | 5/2007 | Shin et al. | |
| 2007/0152926 A1 | 7/2007 | Kwon | |
| 2008/0238860 A1 | 10/2008 | Onodera | |
| 2008/0297464 A1 | 12/2008 | Ito | |
| 2009/0027885 A1 | 1/2009 | Hoshi | |
| 2009/0231264 A1 | 9/2009 | Hatakeyama et al. | |

FOREIGN PATENT DOCUMENTS

| | | |
|---|---|---|
| KR | 10-2006-0031518 A | 4/2006 |
| KR | 10-2008-0109120 A | 12/2008 |
| KR | 10-2009-0109766 A | 10/2009 |

* cited by examiner

*Primary Examiner* — Stephen Sherman
(74) *Attorney, Agent, or Firm* — Birch, Stewart, Kolasch & Birch, LLP

(57) ABSTRACT

According to an embodiment of the present invention, a display device includes a backlight unit that is divided into a plurality of blocks and is driven by the divided blocks, and includes at least one optical assembly, a display panel positioned over the backlight unit, a controller that outputs local dimming values corresponding to brightness of the blocks of the backlight unit, in accordance with an image displayed in the display panel, and a BLU driver that controls brightness of the blocks of the backlight unit using the local dimming values.

22 Claims, 8 Drawing Sheets

DISPLAY DEVICE

CROSS-REFERENCE TO RELATED APPLICATIONS

This application is a Continuation of U.S. patent application Ser. No. 12/796,130 filed on Jun. 8, 2010 now abandoned which claims priority under 35 U.S.C. §119(e) on U.S. Provisional Application No. 61/237,587 filed on Aug. 27, 2009 35 U.S.C. §119(a) and on Patent Application No. 10-2009-0113711 filed in Republic of Korea on Nov. 24, 2009, the entire contents of which are hereby incorporated by reference.

BACKGROUND OF THE INVENTION

1. Field of the Invention

The present invention relates to a display device, in more detail, a method of driving a backlight unit included in a display device.

2. Description of the Related Art

Demands for display devices have been increased in various ways with the development of information society, and a variety of display devices have been correspondingly studied and used in recent years, including LCDs (Liquid Crystal Display Device), PDPs (Plasma Display Panel), ELD (Electro Luminescent Display), VFD (Vacuum Fluorescent Display).

Among others, the liquid crystal panel of the LCDs includes a liquid crystal layer, and a TFT substrate and a color filter substrate facing each other with the liquid crystal layer therebetween and cannot emit light by itself, such that it can display images with the use of light provided from a backlight unit.

SUMMARY OF THE INVENTION

It is an object of the present invention to provide a method of efficiently driving a backlight unit of a display device, and a display device using the method.

A display device according to an embodiment of the present invention includes: a backlight unit that is divided into a plurality of blocks, driven for each of the divided blocks, and includes at least one optical assembly; a display panel that is disposed above the backlight unit; a controller that outputs local dimming values for each block corresponding to the brightness of the blocks in the backlight unit, in accordance with an image displayed on the display panel; and a BLU driver that controls the brightness of the blocks in the backlight unit, using the local dimming values for each block; in which the optical assembly includes: a first layer; a plurality of light sources formed on the first layer and emitting light; a second layer disposed above the first layer to cover the light sources; and a reflective layer that is disposed between the first and second layers, and the BLU driver outputs a plurality of driving signals in response to the input local dimming values for each block, and the driving signals each control the brightness of two or more blocks in the blocks of the backlight units.

A display device according to another embodiment of the present invention includes: a backlight unit that is divided into a plurality of blocks, driven for each of the divided blocks, and includes at least one optical assembly; a display panel that is disposed above the backlight unit; a controller that outputs local dimming values for each block corresponding to the brightness of the blocks in the backlight unit, in accordance with an image displayed on the display panel; and a BLU driver that controls the brightness of the blocks in the backlight unit, using the local dimming values for each block, in which the optical assembly includes: a first layer; a plurality of light sources formed on the first layer and emitting light; a second layer disposed above the first layer to cover the light sources; and a reflective layer that is disposed between the first and second layers, the BLU driver includes an driving unit, and the driving unit includes a controller that receives local dimming value for each block from the controller and a plurality of driver ICs outputting driving signals for controlling the brightness of the two or more blocks.

A display device according to another embodiment of the present invention includes: a backlight unit that is divided into a plurality of blocks and is driven by the divided blocks, and includes at least one optical assembly; a display panel positioned over the backlight unit; a controller that outputs local dimming values corresponding to brightness of the blocks of the backlight unit, in accordance with an image displayed in the display panel; and a BLU driver that controls brightness of the blocks of the backlight unit using the local dimming values, wherein the optical assembly includes: a first layer; a plurality of light sources that are formed on the first layer and emit light, and a light emitting surface of the light source being formed in the direction crossing the first layer, and at least two of the light sources emitting lights in different directions from each other; a second layer disposed above the first layer to cover the light sources; and a reflective layer that is disposed between the first and second layers, wherein the BLU driver receives the local dimming values and outputs a plurality of driving signals, and the driving signals control the brightness of two or more blocks among the blocks of the backlight unit respectively.

A display device according to another embodiment of the present invention includes: a backlight unit that is divided into a plurality of blocks and is driven by the divided blocks, and includes at least one optical assembly; a display panel positioned over the backlight unit; a first controller that outputs local dimming values corresponding to brightness of the blocks of the backlight unit, in accordance with an image displayed in the display panel; and a BLU driver that controls brightness of the blocks of the backlight unit using the local dimming values, wherein the optical assembly includes: a first layer; a plurality of light sources that is are formed on the first layer and emit light, and a light emitting surface of the light source being formed in the direction crossing the first layer, and at least two of the light sources emitting lights in different directions from each other; a second layer disposed above the first layer to cover the light sources; and a reflective layer that is disposed between the first and second layers, and wherein the BLU driver includes a driving unit, and the driving unit includes a second controller that receives local dimming values from the first controller and a plurality of driver ICs that output driving signals for controlling the brightness of the two or more blocks respectively.

According to a backlight unit of an embodiment of the present invention, it is possible to reduce the thickness of a display device, simplify the manufacturing process of the display device and improve the external appearance by disposing the backlight unit in close contact to a display panel. Further, it is possible to improve the contrast of a displayed image, using a partial driving method, such as local dimming.

DETAILED DESCRIPTION OF THE PREFERRED EMBODIMENTS

Figure 1:
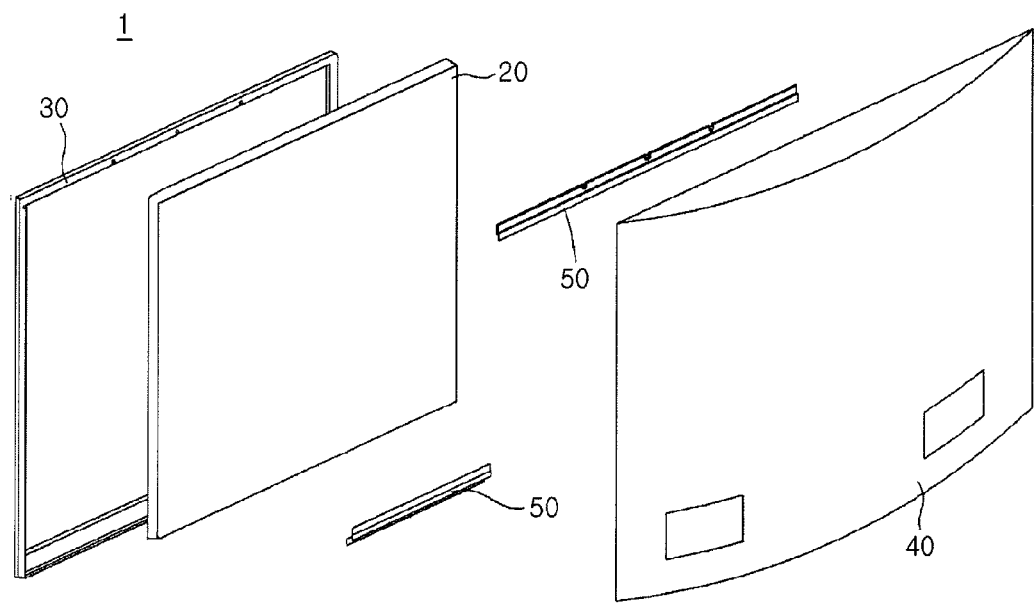
FIG. 1 is an exploded perspective view showing a configuration of a display device.

The present invention is described hereafter with reference to the accompanying drawings. The embodiment described hereafter can be modified in various ways and the technical spirit of the embodiments is not limited to the following description. The embodiments are provided for those skilled in the art to fully understand the present invention. Therefore, the shape and size of the components shown in the drawings may be exaggerated for more clear explanation.

FIG. 1 is an exploded perspective view showing the configuration of a display device.

Referring to FIG. 1, a display device 1 includes a display module 20, a front cover 30 and a back cover 40 which cover the display module 20, and fixing members 50 that fixes the display module to the front cover 30 and/or the back cover 40.

Meanwhile, the front cover 30 may include a front panel (not shown) made of a transparent material transmitting light and the front panel is disposed at a predetermined distance from the display module 20, in detail, at the front of a display panel (not shown) included in the display module to protect the display module 20 from an external shock and transmit light emitted from the display module 20 such that an image displayed on the display module 20 can be seen from the outside.

The fixing members 50 have one side fixed to the front cover 30 by fasteners, such as screws, and the other side supporting the display module 20 with respect to the front cover 30 such that the display module 20 can be fixed to the front cover 30.

Although the fixing member 50 exemplified by a long plate in this embodiment, it may be possible to implement a configuration in which the display module 20 is fixed to the front cover 30 or the back cover 40 by fasteners, without the fixing members 50.

Figure 2:
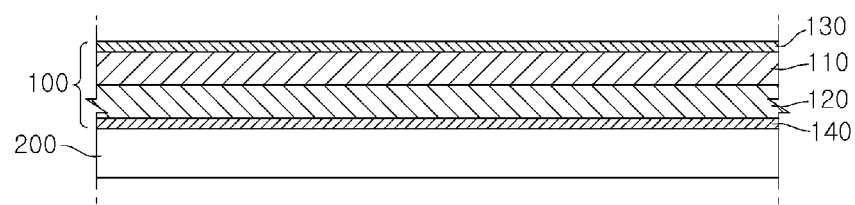
FIG. 2 is a cross-sectional view schematically showing a configuration of a display module.

FIG. 2 is a cross-sectional view schematically showing the configuration of a display device according to an embodiment of the present invention, in which a display module 20 of the display device may include a display panel 100 and a backlight unit 200.

Referring to FIG. 2, the display panel 100 includes a color filter substrate 110 and a TFT (Thin Film Transistor) substrate 120 facing and bonded to each other with a uniform gap, and a liquid crystal layer (not shown) may be disposed between the substrates 110 and 120.

The color filter substrate 110 includes a plurality of pixels composed of red R, green G, and blue B sub-pixels and can create an image corresponding to the red, green, or blue color when light is applied.

Meanwhile, although the pixels may be composed of the red, green, and blue sub-pixels, this configuration is not necessarily limited thereto and may be implemented in various combinations, such as when one pixel is composed of red, green, blue, and white W sub-pixels.

The TFT substrate 120 is a switching element that can switch pixel electrodes (not shown). For example, a common electrode (not shown) and the pixel electrode can change the arrangement of molecule in the crystal layer in response to a predetermined voltage applied from the outside.

The liquid crystal layer includes a plurality of liquid crystal molecules and the liquid crystal molecules change the arrangement in response to the voltage difference generated between the pixel electrode and the common electrode. Accordingly, the light emitted from the backlight unit 200 can travel into the color filter substrate 110 by changes in the arrangement of the liquid crystal molecules.

Further, an upper polarizer 130 and a lower polarizer 140 may be disposed on and beneath, respectively, the display panel, and in detail, the upper polarizer 130 may be disposed on the color filter substrate 110 and the lower polarizer 140 may be disposed beneath the TFT substrate 120.

On the other hand, a gate generating driving signals for driving the panel 100 and a data driving unit (not shown) may be provided at the sides of the display panel 100.

The structure and configuration, described above, of the display panel 100 are just exemplified and the embodiment may be modified, added, and removed within the spirit of the present invention.

As shown in FIG. 2, the display device according to an embodiment of the present invention may be configured by disposing the backlight unit 200 in close contact to the display panel 100.

For example, the backlight unit 200 may be bonded and fixed to the lower surface of the display panel, in detail, to the lower polarizer 140, and for this configuration, an adhesive layer (not shown) may be provided between the lower polarizer 140 and the backlight unit 200.

By disposing the backlight unit 200 in close contact to the display panel 100, as described above, it is possible to reduce the entire thickness of the display device to improve the external appearance and it is also possible to simplify the structure of the display device and the manufacturing process by removing a structure for fixing the backlight unit 200.

Further, since the space between the backlight unit 200 and the display panel 100 is removed, it is possible to prevent the display device from the display device and the image quality of display images from deteriorating due to foreign substances inserted in the space.

According to an embodiment of the present invention, the backlight unit 200 may be formed by stacking a plurality of function layers and at least one of the function layers may be provided with a plurality of light sources (not shown).

Further, it is preferable that the backlight unit 200, in detail, the layers of the backlight unit 200 are made of a flexible material in order to fix the backlight unit 200 in close contact to the lower surface of the display panel 100, as described above.

Further, a bottom cover (not shown) where the backlight unit 200 is seated may be provided under the backlight unit 200.

According to an embodiment of the present invention, the display panel 100 may be divided into a plurality of regions and the brightness of the light emitted from corresponding regions of the backlight unit 200, that is, the brightness of corresponding light sources is adjusted in response to the gray peak values or color coordinate signals of the divided regions, such that the luminance of the display panel 100 can be adjusted.

For this configuration, the backlight unit 200 may operate in a plurality of driving regions divided to correspond to the divided regions of the display panel 100.

Figure 3:
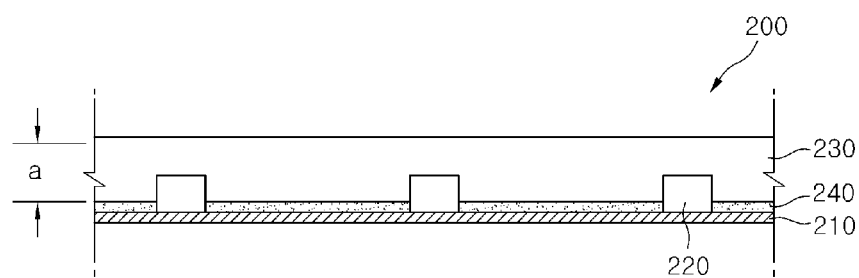
FIG. 3 is a cross-sectional view showing a configuration of a backlight unit according to a first embodiment of the present invention.

FIG. 3 is a cross-sectional view showing the configuration of a backlight unit according to a first embodiment of the present invention, in which the backlight unit 200 may include a first layer 210, light sources 220, a second layer 230, and a reflective layer 240.

Referring to FIG. 3, the light sources 220 may be formed on the first layer 210 and the second layer 230 may be disposed above the first layer 210 to cover the light sources 220.

The first layer 210 may be a substrate on which the light sources 220 are mounted and may be provided with an adapter (not shown) supplying power and an electrode pattern (not shown) for connecting the light sources 220. For example, a carbon natotube electrode pattern (not shown) may be formed on the substrate to connect the light sources 220 with the adapter (not shown).

On the other hand, the first layer 210 may be a PCB (Printed Circuit Board) that is made of polyethylene terephthalate, glass, polycarbonate, and silicon etc. to mount the light sources 220 in a film shape.

The light source 220 can emit light at a predetermined directional angle from a predetermined direction and the predetermined direction may be a direction in which the light emitting surface of the light source 220 is aligned.

According to an embodiment of the present invention, the light source 220 may be formed of an LED (Light Emitting Diode) and may include a plurality of LEDs. For example, the light source 220 formed of a light emitting diode can emit light at about 120° directional angle from the direction in which the light emitting surface is aligned.

To be specific, the LED package of the light source 220 can be classified into a top view type and a side view type in accordance with the direction in which the light emitting surface is aligned, and the light sources 220 according to an embodiment of the present invention can be formed of at least one of a top view type LED package with the light emitting surface upward and a side view type LED package with the light emitting surface at a side.

The light source 220 according to an embodiment of the present invention can be formed of the side view type LED package.

In this case, the light emitting surface of the light source 220 can be formed in the direction crossing the first layer 210.

According to an embodiment of the present invention, the light emitting surface of the light source 220 and the first layer 210 may cross at a right angle.

Further, the light source 220 may be formed of a color LED emitting at least one of colors including red, blue, and green, or a white LED. Furthermore, the color LED may include at least one of a red LED, a blue LED, and a green LED, and it is possible to change the arrangement of the light emitting diodes and light emitted from the diodes within the scope of the embodiment.

On the other hand, the second layer 230 disposed above the first layer 210 to cover the light sources 220 transmits and diffuses light emitted from the light sources 220 such that the light emitted from the light sources 220 uniformly travels to the display panel 100.

The reflective layer 240 reflecting the light emitted from the light sources 220 may be disposed between the first layer 210 and the second layer 230, in detail, on the first layer 210. The reflective layer 240 reflects again the light total-reflecting from the interface of the second layer 230 such that the light emitted from the light sources 220 can be diffused wider.

The reflective layer 240 may be a synthetic resin sheet with white pigments, such as titanium dioxide, diffused therein, with a metal film deposited on the surface, or with bubbles therein to disperse light, and silver (Ag) may be coated on the surface to increase reflectivity. Further, the reflective layer 240 may be coated on the first layer 210, a substrate.

The second layer 230 may be made of a light-transmissive material, for example, a silicon-based or acryl-based resin. The second layer 230, however, is not limited to the materials described above, and may be made of various resins.

Further, the second layer may be made of a resin having about 1.4 to 1.6 refractive index in order for the backlight unit 200 has uniform luminance while diffusing the light emitted from the light sources 220.

For example, the second layer 230 may be made of any one material selected from a group of polyethylene terephthalate, polycarbonate, polypropylene, polyethylene, polystyrene, polyepoxy, silicon, and acryl.

The second layer may include a polymer resin having predetermined adhesive property to be firmly fixed to the light sources 220 and the reflective layer 240. For example, the second layer 230 may include acryl-based, urethane-based, epoxy-based, and melamine-based unsaturated polyester, methyl methacrylate, ethyl methacrylate, isobutyl methacrylate, n-butyl methacrylate, n-butyl methyl methacrylate, acryl acid, methacrylic acid, hydroxyethyl methacrylate, hydroxyl propyl methacrylate, hydroxylethyl acrylate, acrylamide, methylolacrylamide, glycidolmethacrylate, ethylacrylate, isobutyl acrylate, n-butyl acrylate, 2-ethylhexyl acrylate polymer, copolymer, or terpolymer.

The second layer 230 may be formed by applying and hardening liquid-state or gel-state resin above the first surface 210 with the light sources 220 and the reflective layer 240 thereon, or may be separately formed and then bonded onto the first layer 210.

Meanwhile, the larger the thickness (a) of the second layer 230, the wider the light emitted from the light sources 200 is diffused, such that light can be supplied to the display panel 100 at uniform luminance from the backlight unit 200. On the contrary, the larger the thickness (a) of the second layer 230, the more the amount of light absorbed in the second layer 230 increases, such that the entire luminance of the light supplied from the backlight unit 200 to the display panel 100 may be reduced.

Therefore, it is preferable that the thickness (a) of the second layer 230 is about 0.1 to 4.5 mm to supply light having uniform luminance without largely reducing the luminance of the light supplied from the backlight unit 200 to the display panel 100.

The configuration of the backlight unit 200 according to an embodiment of the present invention is described hereafter in detail by way of an example that the first layer 210 of the backlight unit 200 is a substrate with the plurality of light sources 220 and the second layer 220 is a resin layer made of a predetermined resin.

Figure 4:
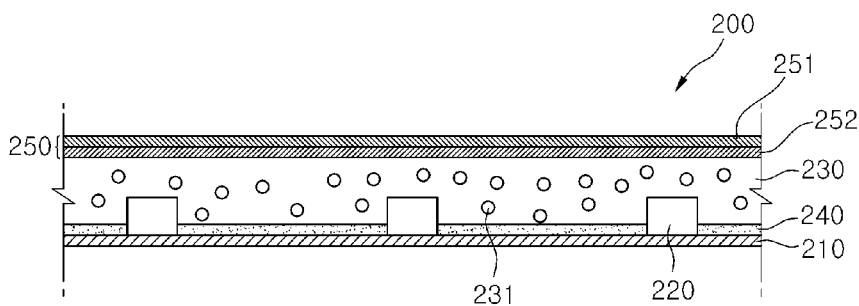
FIG. 4 is a cross-sectional view showing a configuration of a backlight unit according to a second embodiment of the present invention.

FIG. 4 is a cross-sectional view showing the configuration of a backlight unit according to a second embodiment of the present invention and, in the configuration of the backlight unit 200 shown in FIG. 4, the same parts as those described in connection with FIGS. 2 and 3 are not described below.

Referring to FIG. 4, a plurality of light sources 220 may be mounted on a substrate 210 and a resin layer 230 may be disposed above the substrate 210. Further, a reflective layer 240 may be formed between the substrate 210 and the resin layer 230, in detail, on the substrate 210.

Further, as shown in FIG. 4, the resin layer 230 may include a plurality of dispersed particles 231 and the dispersed particles 231 can disperse or refract incident light such that the light emitted from the light sources 220 is diffused wider.

The dispersed particles 231 may be made of a material having refractive index different from the material of the resin layer 230, in detail, a material having refractive index higher than a silicon-based or acryl-based resin of the resin layer 230, in order to disperse or refract the light emitted from the light sources 220.

For example, the dispersed particles 231 may be made of polymethyl methacrylate/styrene copolymer (MS), polymethyl methacrylate (PMMA), polystyrene (PS), silicon, titanium dioxide ($TiO_2$), silicon dioxide ($SiO_2$) etc., or may be made of combination of those compounds.

Alternatively, the dispersed particles 231 may be made of a material having refractive index smaller than the material of the resin layer 230, for example, may be made by creating bubbles in the resin layer 230.

However, the material for the dispersed particles 231 is not limited to the materials described above and a variety of polymers or inorganic particles may be used.

According to an embodiment of the present invention, the resin layer 230 may be made by mixing the dispersed particles 231 with liquid-state or gel-state resin, and then applying and hardening the mixture on the first layer 210 with the light sources 220 and the reflective layer 240 thereon.

Referring to FIG. 4, an optical sheet 250 may be disposed on the resin layer 230, and for example, the optical sheet 250 may include a prism sheet 251 and a diffusing sheet 252.

In this case, the sheets are bonded in close contact with each other without a gap in the optical sheet 250, such that it is possible to minimize the thickness of the optical sheet 250 or the backlight unit 200.

On the other hand, the lower surface of the optical sheet 250 may be in close contact to the resin layer 230 and the upper surface may be in close contact to the lower surface of the display panel 100, in detail, to the lower polarizer 140.

The diffusing sheet 252 diffuses the incident light to prevent the light traveling out of the resin layer 230 from partially collecting, thereby keeping the luminance of the light uniform. Further, the prism sheet 251 can collect the light traveling out of the diffusing sheet 252 such that the light can travel perpendicularly into the display panel 100.

According to another embodiment of the present invention, in the optical sheet 250 described above, for example, at least one of the prism sheet 251 and the diffusing sheet 252 may be removed, or various function layers may be further included, other than the prism sheet 251 and the diffusing sheet 252.

Figure 5:
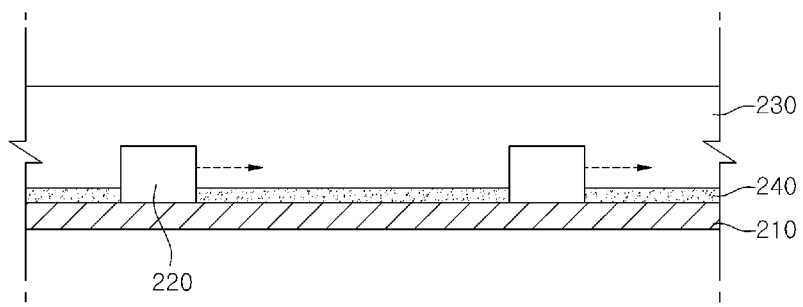
FIG. 5 is a cross-sectional view showing a configuration of a backlight unit according to a third embodiment of the present invention.

FIG. 5 is a cross-sectional view showing the configuration of a backlight unit according to a third embodiment of the present invention and, in the configuration of the backlight unit 200 shown in FIG. 5, the same parts as those described in connection with FIGS. 2 and 4 are not described below.

Referring to FIG. 5, a plurality of light sources 220 in the backlight unit 200 are arranged with the light emitting surfaces aligned at the sides, such that they can emit light to the sides, that is, in the direction in which a substrate 210 or a reflective layer 240 extends.

For example, the light sources 220 may be formed by a side view type LED package, and accordingly, it is possible to reduce the problem that the light sources 220 appear like hot spots on the image and make the display device as well as the backlight unit 200 slim by decreasing the thickness (a) of a resin layer 230.

Figure 6:
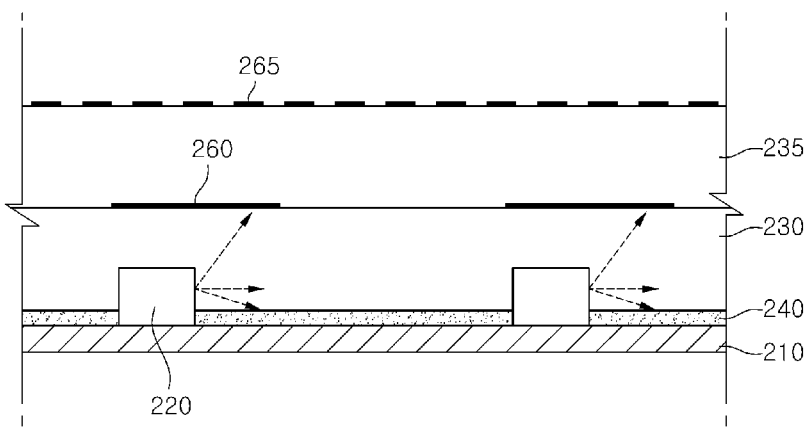
FIG. 6 is a cross-sectional view showing a configuration of a backlight unit according to a fourth embodiment of the present invention.

FIG. 6 is a cross-sectional view showing the configuration of a backlight unit according to a fourth embodiment of the present invention, in which a plurality of resin layers 230 and 235 may be included in the backlight unit 200.

Referring to FIG. 6, the light emitted from the side of a light source 220 can travel to the region where an adjacent light source 225 is disposed, through the first resin layer 230.

A portion of the light traveling through the first resin layer 230 can be emitted upward to the display panel 100, and for this configuration, the first resin layer 230, as described with reference to FIG. 4, may include the plurality of dispersed particles 231 to disperse or refract the light upward.

Further, a portion of the light emitted from the light source 220 can travel into the reflective layer 240, and as described above, the light that have traveled in the reflective layer 240 can be reflected and diffused upward.

Meanwhile, light having large luminance can be observed in the image, because a large amount of light can be emitted from the region around the light source 220 by strong diffusion around the light source or the light emitted substantially upward from the light source 220.

Therefore, as shown in FIG. 6, first light-shielding patterns 260 are formed on the first resin layer 230 to reduce the luminance of the light emitted from the region around the light source 220, such that light can be emitted at uniform luminance from the backlight unit 200.

For example, the first light-shielding pattern 260 can be formed on the first resin layer 230 to correspond to the position of the plurality o flight sources 220, such that it can reduce the luminance of the light emitted upward by blocking a portion of the light emitted from the light source 220 and transmitting the rest.

In detail, the first light-shielding pattern 260 may be made of titanium dioxide ($TiO_2$), in which it can reflect downward a portion of the incident light from the light source 220 and transmitting the rest.

According to an embodiment of the present invention, a second resin layer 235 may be disposed on the first resin layer 230. The second resin layer 235 may be made of a material the same as or different from the first resin layer 230 and can improve the uniformity in luminance of the light from the backlight unit by diffusing light emitted upward through the first resin layer 230.

The second resin layer 235 may be made of a material having the same refractive index as the material of the first resin layer 230, or may be made of a material having different refractive index.

For example, when the second resin layer 235 is made of a material having larger refractive index than the first resin layer 230, the light emitted through the first resin layer 230 can be diffused wider.

On the contrary, when the second resin layer 235 is made of a material smaller than the first resin layer 230, it is possible to improve reflectivity of the light emitted through the first resin layer 230 and then reflecting from the lower surface of the second resin layer 235, such that the light emitted from the light source 220 can easily travel along the first resin layer 230.

Meanwhile, the first resin layer 230 and the second resin layer 235 may each include a plurality of dispersed particles, in which the density of the dispersed particles included in the second resin layer 235 may be larger than that of the dispersed particles included in the first resin layer 230.

When the dispersed particles are included at higher density in the second resin layer 235, as described above, it is possible to diffuse wider the light emitted upward through the first resin layer 230, and accordingly, the light emitted from the backlight unit 200 can be made uniform in luminance.

On the other hand, as shown in FIG. 6, second light-shielding patterns 265 may be formed on the second resin layer 235 to make the light emitted through the second resin layer 235 uniform in luminance.

For example, when large luminance is observed in the image by the light emitted upward through the second resin layer 235 and collecting to a specific portion, it is possible to form the second light-shielding pattern 265 at the region corresponding to the specific portion on the upper surface of the second resin layer 235, and accordingly, it is possible to make the light emitted from the backlight unit 200 uniform in luminance by reducing the luminance of the light at the specific portion.

The second light-shielding pattern 265 may be made of titanium dioxide ($TiO_2$), in which a portion of the light emitted through the second resin layer 235 may be reflected downward from the second light-shielding pattern 265 and the rest may transmitting it.

Figure 7:
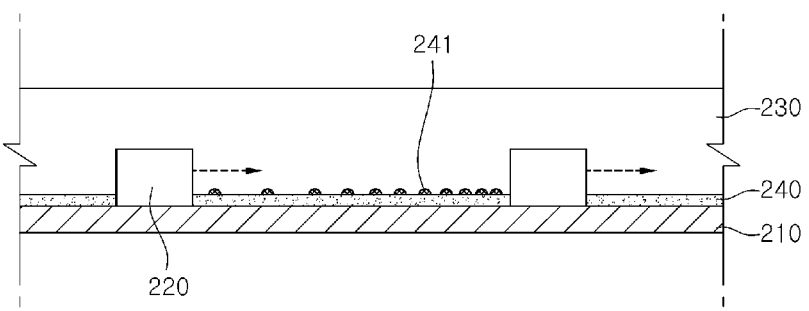
FIG. 7 is a cross-sectional view showing a configuration of a backlight unit according to a fifth embodiment of the present invention.

FIG. 7 is a cross-sectional view showing the configuration of a backlight unit according to a fifth embodiment of the present invention and, in the configuration of the backlight unit 200 shown in FIG. 7, the same parts as those described in connection with FIGS. 2 to 6 are not described below.

A plurality of patterns 241 may be formed on a reflective layer 240 so that the light emitted from a light source 220 can easily travel to an adjacent light source 225.

Referring to FIG. 7, the plurality of patterns 241 protruding upward may be formed on the reflective layer 240, such that the light emitted from the light source 220 and then travels into the patterns 241 can be dispersed and reflected in the traveling direction.

Meanwhile, as shown in FIG. 7, the further from the light source 220, that is, the closer to the adjacent light source 225, the larger the density of the patterns 241 on the reflective layer 240.

For example, the further from the light source 220 emitting light toward the reflective layer 240, the larger the density of the patterns 241.

Accordingly, it is possible to prevent the luminance of the light emitted upward from a region far from the light source 220, that is, a region close to the adjacent light source 225, from being reduced, such that the luminance of the light supplied from the backlight unit 200 can be kept uniform.

Further, the patterns 241 may be made of the same material as the reflective layer 240, in which the patterns 241 can be formed by machining the upper surface of the reflective layer 240.

Alternatively, the patterns 241 may be made of a different material from the reflective layer 240, and for example, the patterns 241 may be formed on the reflective layer 240 by dispersing or coating particles on the reflective layer 240.

Further, the patterns 241 may be formed in various shapes, including a prism, without being limited to that shown in FIG. 7.

In addition, the patterns 241 may be depressed on the reflective layer 240 and may be formed only at predetermined portions on the reflective layer 240.

Figure 8:
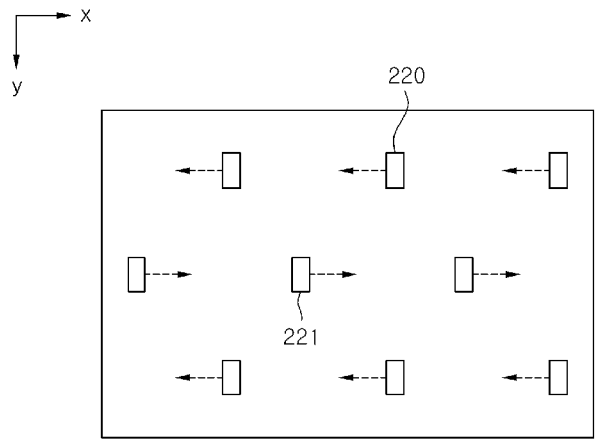
FIG. 8 is a plan view showing an embodiment of an arrangement structure of a plurality of light sources in a backlight unit according to the present invention.

FIG. 8 is a plan view showing the front shape of a backlight unit according to an embodiment of the present invention, which exemplifies an arrangement structure of a plurality of light sources in the backlight unit 200.

Referring to FIG. 8, the backlight unit 200 may include two or more light sources which emit light in different directions.

For example, the backlight unit 200 may include first light sources 220 and second light sources 221 which emit light from the side in parallel with the x-axis, in which the first light sources 220 and the second light sources 221 may be arranged across the x-axis direction in which light is emitted, that is, arranged adjacent to each other in the y-axis direction.

In other words, as shown in FIG. 8, the second light sources 221 may be arranged adjacent to the first light sources 220 in the diagonal direction.

Meanwhile, the first light sources 220 and the second light sources 221 can emit light in opposite directions, that is, the first light sources 220 can emit light opposite to the x-axis direction and the second light sources 221 can emit light in the x-axis direction.

In this configuration, the light sources in the backlight unit 200 can emit light to the sides and a side view type LED package can be used to implement the configuration.

On the other hand, as shown in FIG. 8, the light sources of the backlight unit 200 may be arranged in two or more rows and the two or more light sources in the same row can emit light in the same direction.

For example, the light sources at the left and right sides of the first light source 220 can emit light in the same direction as the first light source 220, that is, opposite to the x-axis direction, and the light sources at the left and right sides of the second light source 221 can emit light in the same direction as the second light source 221, that is, in the x-axis direction.

It is possible to prevent the luminance of the light from concentrating or reducing in a predetermined region of the backlight unit 200 by arranging the light sources adjacent in the y-axis direction, for example, by aligning the light-emitting direction of the first light sources 220 and the second light sources 221 in the opposite directions.

That is, the light emitted from the first light source 220 can be weakened while traveling to an adjacent light source, and accordingly, the further from the first light source 220, the more the luminance of the light emitted from the corresponding region to the display panel may be weakened.

Therefore, it is possible to compensate the concentration of luminance of the light in the region adjacent to the light source with the weakening of luminance of the light in the region far from the light source by arranging the first light source 220 and the second light source 221 such that the light-emitting direction are opposite, as shown in FIG. 8, and it is correspondingly possible to make the luminance of the light emitted from the backlight unit 200 uniform.

Figure 9:
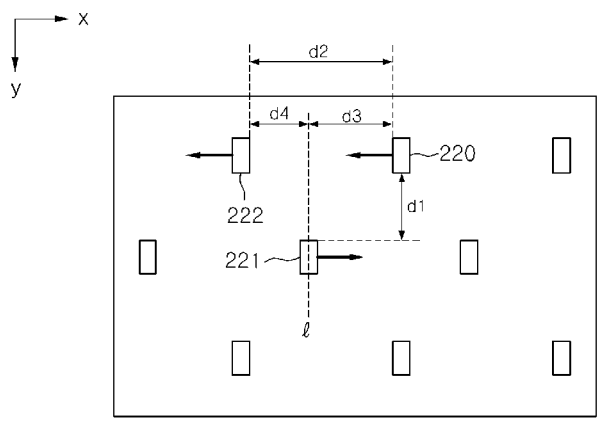
FIG. 9 is a plan view showing an embodiment of a positional relationship between the light sources arrange in the backlight unit.

Referring to FIG. 9, the first light sources 220 and the second sources 221 may be disposed at a predetermined distance d1 from each other along the y-axis perpendicular to the x-axis along which light is emitted.

As the distance d1 between the first light source 220 and the second light source 221, there may be a region where the light emitted from the first light source 220 or the second light source cannot reach, such that the luminance of the light may be largely decreased in the region.

Meanwhile, as the distance between the first light source 220 and the second light source 221 decreases, there may be interference between light emitted from the first light source 220 and the second light source 221, in which division driving efficiency of the light sources may be reduced.

Therefore, the distance d1 between two adjacent light sources in the direction crossing the light-emitting direction, that is, between the first light source 220 and the second light source 221 may be 9 to 27 mm, in order to implement uniform luminance of the light emitted from the backlight unit 200 while reducing the interference between the light sources.

Further, a third light source 222 may be disposed adjacent to the first light source 220 in the x-axis direction, at a predetermined distance d2 from the first light source 220.

Meanwhile, the light-directional angle θ from the light source and the light-directional angle θ' in the resin layer 230 may have the following Equation 1 in accordance with Snell's law.

$$\frac{n1}{n2} = \frac{\sin\theta'}{\sin\theta} \quad \text{[Equation 1]}$$

On the other hand, considering that the portion where light is emitted from the light source is an air layer (1 of refractive index) and the light-directional angle θ from the light source is generally 60°, the light-directional angle in the resin layer 230 may have the value expressed by the following Equation 2, in accordance with Equation 1.

$$\sin\theta' = \frac{\sin 60°}{n2} \quad \text{[Equation 2]}$$

Further, when the resin layer 230 is made of acryl-based resin, such as PMMA (polymethyl methacrylate), it has refractive index of about 1.5, such that the light-directional angle θ' of about 35.5° in the resin layer 230 in accordance with Equation 2.

As described with reference to Equations 1 and 2, the directional angle of the light emitted from the light source in the resin layer 230 may be less than 45°, and accordingly, the range of the light emitted from the light source and traveling in the y-axis direction may be smaller than the x-axis direction.

Therefore, the distance d1 between two light sources adjacent to each other across the light-emitting direction, that is, between the first light source 220 and the second light source 221 may be smaller than the distance d2 between two light sources adjacent to each other in the light-emitting direction, that is, between the first light source 220 and the third light source 222, such that the luminance of the light emitted from the backlight unit 200 can be uniform.

Meanwhile, considering the distance d1 between the first light source 220 and the second light source 221 having the above range, the distance d2 between two light sources adjacent to each other in the light-emitting direction, that is, between the first light source 220 and the third light source 222 may be 5 to 22 m, in order to reduce interference between the light sources and make the luminance of the light emitted from the backlight unit 200 uniform.

Referring to FIG. 9, the second light source 221 may be disposed to correspond to a predetermined position between the first light source 220 and the third light source 222 adjacent to each other in the light-emitting direction, that is, the x-axis direction.

In other words, the second light source 221 may be disposed adjacent to the first light source 220 and the third light source 222 in the y-axis direction, on the line (l) passing through between the first light source 220 and the third light source 222.

In this case, the distance d3 between the line (l) on which the second light source 221 is disposed and the first light source 220 may be larger than the distance d4 between the line (l) and the third light source 222.

The light emitted from the second light source 221 travels toward the third light source 222, such that the luminance of the light emitted toward the display panel 100 may weaken in a region around the third light source 222.

Therefore, it is possible to compensate the weakening of the luminance of light in a region around the third light source 222 with the luminance of the light concentrating in a region around the second light source 221, by disposing the second light source 221 closer to the third light source 222 than the first light source 220, as described above.

Figure 10:
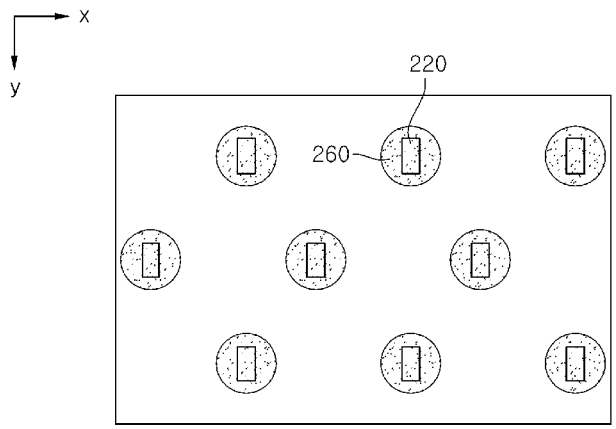
FIG. 10 is a plan view showing an embodiment of the shape of a light-shielding pattern formed in the backlight unit.

FIG. 10 is a plan view showing an embodiment of the shape of a light-shielding pattern formed in a backlight unit, in the configuration of the backlight unit 200 shown in FIG. 10, the same parts as those described in connection with FIGS. 2 to 9 are not described below.

Referring to FIG. 10, a plurality of light-shielding patterns 260 may be formed to correspond to the positions of a plurality of light sources 220.

For example, as shown in FIG. 6, light-shielding patterns 260 are formed on the first resin layer 230 covering the lights sources to reduce the luminance of the light emitted from the region around the light source 220, as described above, such that light can be emitted at uniform luminance from the backlight unit 200.

According to an embodiment of the present invention, as shown in FIG. 10, circular or elliptical light-shielding patterns 260 may be made of titanium dioxide TiO2 on the resin layer 230 to correspond to the positions of the light sources 220, such that it is possible to block a portion of the light emitted upward from the light sources 220.

Figure 11:
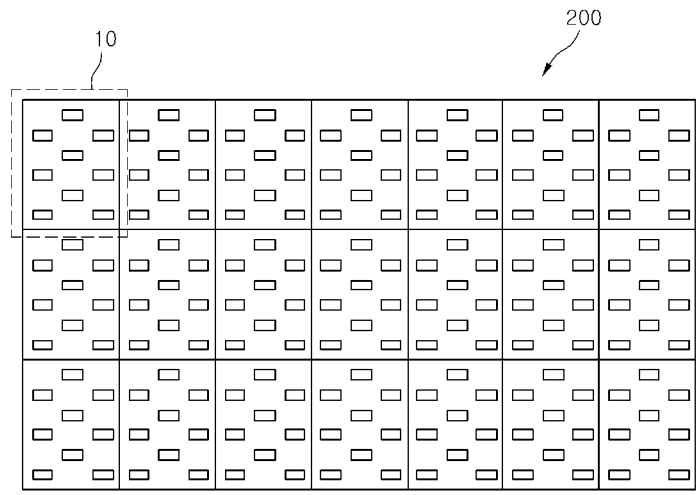
FIG. 11 is a cross-sectional view showing a configuration of a backlight unit according to a sixth embodiment of the present invention.

FIG. 11 is a cross-sectional view showing the configuration of a backlight unit according to a sixth embodiment of the present invention.

Referring to FIG. 11, first layer 210, a plurality of light sources 220 formed on the first layer, a second layer 230 covering the light sources 220, and a reflective layer 240, as described with reference to FIG. 10, may be formed in one optical assembly 10, and a backlight unit 200 may be composed of a plurality of the optical assemblies 10.

Meanwhile, N and M optical assemblies 10 of the backlight unit 200 may be disposed in a matrix in the x-axis and y-axis directions, respectively, where N and M are integers of 1 or more.

As shown in FIG. 11, twenty one optical assemblies 10 may be arranged in a 7×3 matrix in the backlight unit 200.

The configuration shown in FIG. 11, however, is an example for explaining the backlight unit according to the present invention and the present invention is not limited thereto and may be modified in accordance with the image size etc. of the display device.

For example, for a 47 inch display device, the backlight unit 200 can be implemented by arranging two hundred forty optical assemblies in a 24×10 matrix.

Each of the optical assemblies may be an individual assembly and a module type backlight unit may be formed by disposing them close to each other. The module type backlight unit is a backlight member and can supply light to the display panel 100.

As described above, the backlight unit 200 can be driven in an entire driving type and a partial driving type, such as local dimming and impulsive types. The driving type of the backlight unit 200 may be modified in various ways in accordance with the circuit design and is not modified thereto. As a result, according to the embodiment, it is possible to the contrast and make clear the dark portion and bright portion in the image, thereby improving the image quality.

That is, the backlight unit is driven in a plurality of divided driving regions and it is possible to brightness and definition by reducing the luminance at the dark portion and increasing the luminance at the bright portion in the image, with the luminance of the division driving region linked with the luminance of an image signal.

For example, it is possible to emit light upward by individually driving only some of the optical assemblies 10 shown in FIG. 11, and for this configuration, the lights sources 220 included in the optical assemblies 10 can be individually controlled.

On the other hand, the region corresponding to one optical assembly 10 in the display panel 10 may be divided into two or more blocks, and the display panel 100 and the backlight unit 200 may be driven in the divided block unit.

It is possible to simplify the manufacturing process of the backlight unit 200, minimize losses that may be generated in the manufacturing process, and improve productivity, by combining the optical assemblies 10 to form the backlight unit 200. Further, it is possible to manufacture backlight units having various sizes by standardizing the optical assembly of the backlight unit 200 for mass production.

Meanwhile, since when any one of the optical assemblies 10 of the backlight unit 200 fails, it has only to replace the failed optical assembly without replacing the entire backlight unit, the replacement is easy and the cost needed to replace the part is reduced.

Figure 12:
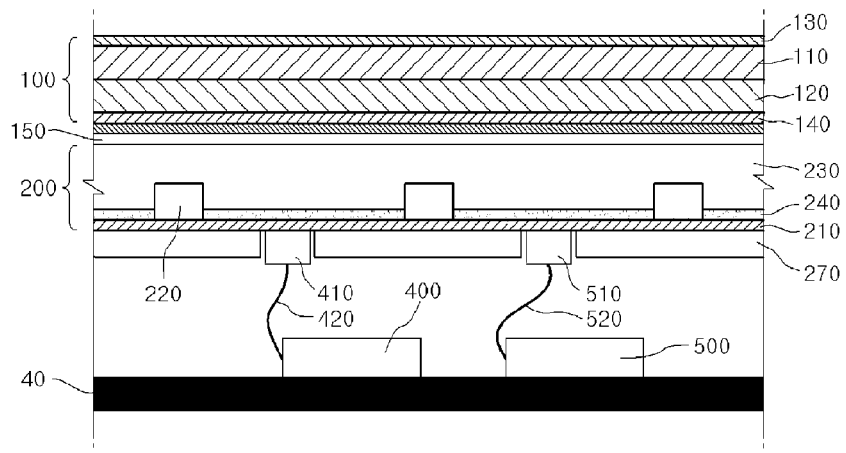
FIG. 12 is a cross-sectional view showing a configuration of a display device according to an embodiment of the present invention.

FIG. 12 is a cross-sectional view showing the configuration of a display device according to an embodiment of the present invention, in the configuration of the display device shown in the figure, the same parts as those described with reference to FIGS. 1 to 11 are not described below.

Referring to FIG. 12, a display panel 100 including a color filter substrate 110, a TFT substrate 120, an upper polarizer 130, and a lower polarizer 140 and a backlight unit 200 including a substrate 210, a plurality of light sources 220, and a resin layer 230 may be disposed in close contact with each other.

For example, an adhesive layer 150 is provided between the backlight unit 200 and the display panel 100, such that the backlight unit 200 can be bonded and fixed to the lower surface of the display panel 100.

In more detail, the upper surface of the backlight unit 200 can be bonded to the lower surface of the lower polarizer 140 by the adhesive layer 150.

The backlight unit 200 may further include a diffusing sheet (not shown) and the diffusing sheet (not shown) may be disposed in close contact to the upper surface of the resin layer 230. In this configuration, the adhesive layer 150 may be provided between the diffusing sheet (not shown) of the backlight unit 200 and the lower polarizer 140 of the display panel 100.

Further, a bottom cover 270 may be disposed under the backlight unit 200, and for example, as shown in FIG. 12, the bottom cover 270 may be in close contact to the lower surface of the substrate 210. The bottom cover 270 may be a protective film protecting the backlight unit 200.

Meanwhile, the display device may include a display module 20, in detail, a power supplier 400 that supplies driving voltage to the display panel 100 and the backlight unit 200, and for example, the light sources 220 of the backlight unit 200 can be driven to emit light by the voltage supplied from the power supplier 400.

As shown in FIG. 12, the power supplier 400 may be fixed to a back cover 40 covering the rear side of the display module 20 to be stably supported and fixed.

According to an embodiment of the present invention, a first connector 410 may be formed on the substrate 210, and for this configuration, a hole may be formed in the bottom cover 270 to insert the first connector 410.

The first connector 410 electrically connects the light source 220 with the power supplier 400 such that driving voltage is supplied from the power supplier 400 to the light source 220.

For example, the first connector 410 may be disposed beneath the substrate 210 and connected with the power supplier 400 through a first cable 420 to transmit driving voltage supplied from the power supplier 400 through the first cable 420 to the light source 220.

An electrode pattern (not shown), for example, a carbon nanotube electrode pattern may be formed on the substrate 210. The electrode formed on the substrate 210 can electrically connect the first connector 410 with the light source 220, in contact with the electrode formed in the light source 212.

Further, the display device may include a controller 500 controlling the display panel 100 and the backlight unit 200, and for example, the controller 500 may be a timing controller.

The timing controller controls the driving timing of the display panel 100, and in detail, creates signals for controlling the driving timings of a data driving unit (not shown), a gamma voltage generating unit (not shown), and a gate driving unit (not shown) included in the display panel 100 and transmits the signals to the display panel 100.

Meanwhile, the timing controller can supply a signal for controlling the driving timing of the light sources 220 to drive the backlight unit 200, in detail, the light sources 220, to the backlight unit 200, when the display panel 100 is driven.

As shown in FIG. 12, the controller 500 may be fixed to a back cover 40 covering the rear side of the display module 20 to be stably supported and fixed.

According to an embodiment of the present invention, a second connector 510 may be formed on the substrate 210, and for this configuration, a hole may be formed in the bottom cover 270 to insert the second connector 510.

The second connector 510 electrically connects the substrate 210 with the controller 500 such that a control signal outputted from the controller 500 can be transmitted to the substrate 210.

For example, the second connector 510 may be disposed beneath the substrate 210 and connected with the controller 500 through a second cable 520 to transmit a control signal supplied from the controller 500 through the second cable 520 to the substrate 210.

Meanwhile, a light driving unit (not shown) may be formed on the substrate and can drive the light sources 220, using the control signal supplied from the controller 500 through the second connector 510.

The configuration of the display device shown in FIG. 12 is provided just as an embodiment and accordingly, if needed, it is possible to change the position and the number of the power supplier 400, the controller 500, the first and second connectors 410 and 510, and the first and second cables 420 and 520.

For example, the first and second connectors 410 and 510 may be provided for each of the optical assemblies 10 of the backlight unit, as shown in FIG. 11, and the power supplier 400 or the controller 500 may be disposed beneath the bottom cover 270.

Figure 13:
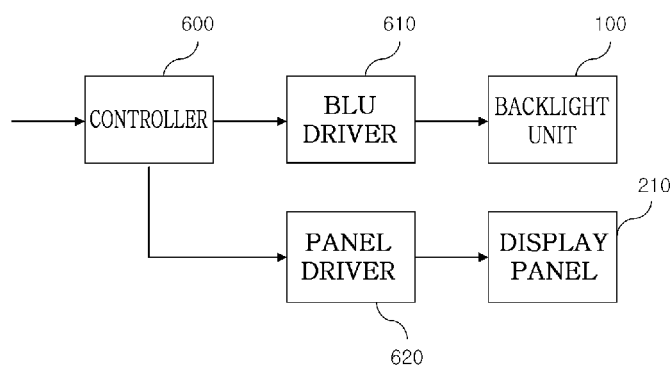
FIG. 13 is a block diagram schematically showing the configuration of the display device according to a first embodiment of the present invention.

FIG. 13 is a block diagram showing the configuration of a display device according to a first embodiment of the present invention, in which the display device may include a controller 600, a BLU driver 610, a panel driver 620, a backlight unit 200, and a display panel 100. Further, in the configuration of the display device shown in FIG. 13, the same parts as those described with reference to FIGS. 1 to 12 are not described below.

Referring to FIG. 13, the display panel 100 can display an image at 60, 120, or 240 frames per second, and the larger the number of frames per second, the shorter the scan period T of the frames.

The panel driver 620 generates driving signals for driving the display panel in response to a variety of control signals and image signals inputted from the controller 600, and transmits the driving signals to the display panel 100. For example, the panel driver 620 may include a gate driving unit connected with a gate line of the display panel 100, a data driving unit (not shown), and a timing controller (not shown) controlling those units.

Meanwhile, the controller 600 can output a local dimming value to the BLU driver 610 according to the image signal to control the backlight unit 200, in detail, the luminance of the light sources in the backlight unit 200 in response to the image signal.

Further, the controller 600 can supply information on the scan period T displaying one frame on the display panel 100, for example, a vertical synchronization signal Vsync to the driving unit 610.

The BLU driver 610 can control the light sources in the backlight unit 200 to emit light in accordance with the scan period T in synchronization with display of an image on the display panel 100.

On the other hand, each of the light sources in the backlight unit 200 may include a plurality of point light sources, for example, LEDs (Light Emitting Diodes), and the point light sources in one block can be simultaneously turned on or off.

Meanwhile, according to an embodiment of the present invention, the light sources in the backlight unit 200 can be divided into a plurality of blocks by the division driving method, such as local dimming described above, and the luminance of the light sources pertaining to each block can be adjusted in accordance with the luminance of a region corresponding to each of the divided blocks in the display panel 100, for example, the gray level peak value or the color coordinate signal.

For example, when an image is displayed in a first region of the display panel 100 and an image is not displayed in a second region, that is, the second region is black, the BLU driver 610 can control the backlight unit 200, in detail, the light sources in the backlight unit 200 such that the light sources pertaining to the blocks corresponding to the second region in the divided blocks emit light at lower luminance than the light sources pertaining to the blocks corresponding to the first region.

Meanwhile, the light sources pertaining to the blocks of the backlight unit 200 which correspond to the second region that is black without displaying an image in the display image of the display panel 100 may be turned off, such that it is possible to reduce power consumed by the display device.

That is, the controller 600 creates and outputs local dimming values corresponding to the brightness of the blocks of the backlight unit 200, that is, local dimming values for each block, in accordance with the luminance level of the input image signal, for example, the luminance level of the entire image or the luminance level at a predetermined region, and the BLU driver 610 can control the brightness of the blocks in the backlight unit 200, using the input local dimming values for each block.

A method of driving a display device according to an embodiment of the present invention is described hereafter in detail with reference to FIGS. 14 to 19.

Figure 14:
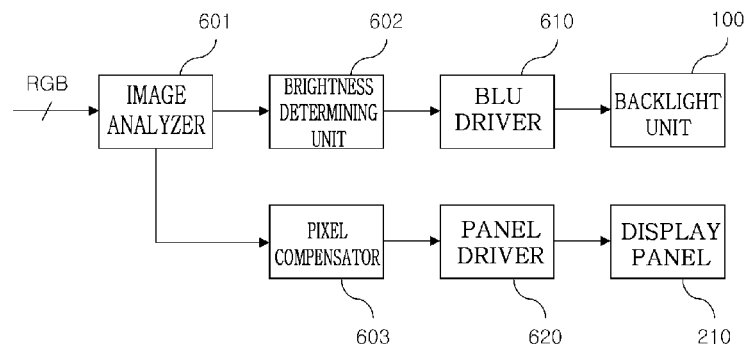
FIG. 14 is a block diagram schematically showing the configuration of the display device according to a second embodiment of the present invention.

FIG. 14 is a block diagram showing the configuration of a display device according to a second embodiment of the present invention, and the configuration of the display device shown in FIG. 14, the same parts as those described with reference to FIGS. 1 to 13 are not described below.

Referring to FIG. 14, a display device according to an embodiment of the present invention an image analyzing unit 601 that determines the luminance level for the entire of a portion of an image in response to an RGB signal, a brightness determining unit 602 that determines the brightness of a light source, for example an LED, which corresponds to the luminance level determined by the image analyzing unit 601, and a BLU driver 610 that drives the backlight unit 200 in accordance with the brightness level determined by the brightness determining unit 602.

Further, the display device may include a pixel compensator 603 that change the luminance level for the RGB image signal in consideration of the luminance level of an image analyzed by the image analyzing unit 601 and a panel driver 620 that outputs an driving signal to the display panel 100 such that an image is outputted in response to the R'G'B' signal compensated by the pixel compensator 603.

The image analyzing unit 601 divides the region of the image into several regions in response to the input RGB signal and supplies information on the luminance level of an image to the brightness determining unit 602 to determine the brightness of the light sources pertaining to the blocks corresponding to the regions in the backlight unit 200.

For example, the information on the luminance level of the image supplied from the image analyzing unit 601 to the brightness determining unit 602 may include not only the ABL (Average Block Level), average luminance level of the region corresponding to a block to determine its brightness, but of another region adjacent to the above-mentioned region or the APL (Average Picuture Level), average luminance level of the entire region of the image.

In other words, the image analyzing unit 601 can divide the image of one frame into a plurality of regions and supply information on not only the average luminance level for a divided first region, but the average luminance level for another region adjacent to the first region, to the brightness determining unit 602. Further, when the brightness determining unit 602 determines the brightness of a specific block in the backlight unit 200, the image analyzing unit 601 can provide corresponding information to allow the brightness determining unit 602 to use the average luminance level of the entire image.

According to an embodiment of the present invention, it is required to include a look-up table that determines the brightness of a specific block in the backlight unit 200 in accordance with the average luminance level of the entire or a portion of the measured image, and the brightness determining unit 602 can read out and output the brightness of a light source corresponding to the average luminance level measured by the image analyzing unit 601 from the look-up table.

Figure 15:
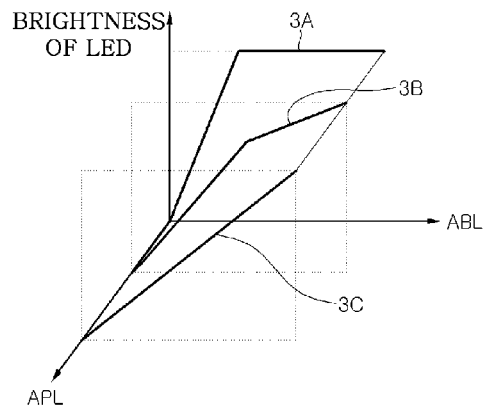
FIG. 15 is a graph showing a first embodiment of a method of determining brightness of a light source according to a average luminance level of an image.

FIG. 15 is a graph showing a first embodiment of a method of determining the brightness of a light source to the average luminance level of an image, in which the x-axis represents the ABL of a divided region of the display panel 210, the y-axis represents the brightness of a block corresponding to the divided region in the backlight unit 100, and the z-axis represents the APL of the entire region.

Referring to FIG. 15, when the APL of the entire image is less than 'A', the brightness of a corresponding block of the backlight unit 200 is determined by a first graph 3A, when the APL of the entire image is 'A' or more and less than 'B', the brightness of a corresponding block of the backlight unit 200 is determined by a second graph 3B, and when the APL of the entire image is 'B' or more, the brightness of the block of the backlight unit 200 is determined by a third graph 3C.

For example, when the APL of the entire image is a predetermined 'B' or more, since the entire image should be displayed bright, the brightness of the corresponding block of the backlight unit 200 can be determined by the third graph 3C. In this case, since the entire image to display on the image panel 100 is bright, it does not matter that the image darkens with the local dimming effect of the backlight unit 200 maximized.

In other words, when the entire image should be displayed bright, the larger the average luminance level measured for each divided region of the image, the higher the brightness of corresponding blocks, whereas the smaller the average luminance of the divided regions, the lower the brightness of the corresponding blocks. For reference, the figure shows that the graph representing the brightness of the LED to the average luminance level at each divided region has one inclination.

On the other hand, when the entire image should be displayed dark, that is, the APL of the entire image is less than 'A', the local dimming can be applied only to the divided regions having average luminance level smaller than a predetermined luminance.

That is, the proposed look-up table makes it possible to apply the local dimming that changes the brightness of the light sources only for the divided region having average luminance level smaller than the predetermined luminance. This is because when the entire image is dark and the brightness of the light source is determined by the local dimming graph, such as the third graph 3C, the image becomes too dark and the color reproduction is deteriorated.

Therefore, when the luminance level of the entire image is low, the local dimming is not applied to the divided regions having average luminance level above a predetermined brightness.

Further, when the APL of the entire image is in between 'A' and 'B' and the average luminance level of a measured divided region is larger than a predetermined value, it is required to decrease changes in brightness of the light source, and when the average luminance level of the divided region is smaller than the predetermined value, it is required to increase changes in brightness of the light source. That is, it is possible to set a small local dimming value corresponding to the light source in bright divided regions, and set a relatively large local dimming value corresponding to the light source in less bright divided regions than the above divided regions.

The graph showing the brightness of a light source to average luminance levels according to the look-up table is stored when the APL of the entire image is the maximum MAX and the APL of the entire image is the minimum MIN, and the table corresponding to the APL of the entire image to measure may be determined between the maximum and minimum graphs of the APL of the entire image.

Figure 16:
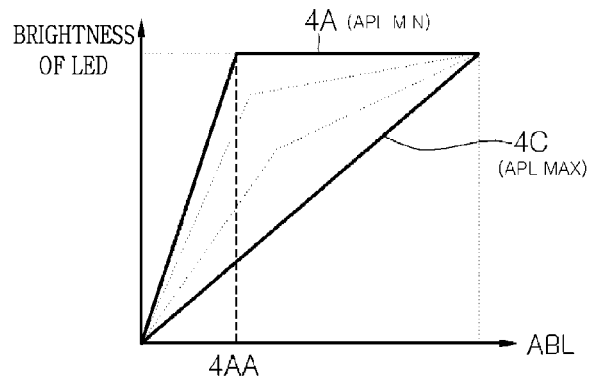
FIG. 16 is a graph showing a second embodiment of a method of determining brightness of a light source according to the average luminance level of an image.

FIG. 16 shows by way of an example that a graph 4C that is applied when the APL of the entire image is the maximum MAX and a graph 4A that is applied when the APL is the minimum MIN. That is, when the APL of the entire image is at the maximum, the brightness of the image is the maximum, and accordingly, even if the local dimming is applied to the divided regions, the color reproduction is not deteriorated and a large amount of power consumed by the backlight unit 200 can be reduced.

Further, when the APL of the entire image is at the minimum, the brightness of the image is the minimum; therefore, in this case, the color reproduction of the image is deteriorated if the local dimming is applied to the entire image. Accordingly, in this case, it is possible to prevent the color reproduction from largely decreasing and reduce the power consumed in driving the backlight unit, by applying the local dimming to the divided region corresponding to when the ABL of the divided region is smaller than a predetermined value 4AA.

Further, when the APL of the entire image is not the maximum or the minimum, it is possible to create a desired look-up table (graph) by interpolating the graphs 4A and 4C. That is, brightness determining unit 602 can create a new graph positioned within a region defined by the graphs 4A and 4C, using the look-up tables when the APL of the entire image is the maximum and the minimum.

According to another embodiment of the present invention, the image signal transmitted to the display panel 100, for example, the RGB signal can be compensated.

In other words, when the local dimming is applied to the backlight unit 200 described above, there may be regions (or pixels) to display colors in the divided regions of the display panel 100. In this case, it is possible to reduce incomplete reproduction of colors due to the local dimming by adding a gain according to the luminance level of the entire image to the RGB signal transmitted to the panel driver 620.

For example, when the local dimming is applied to a specific region in the image, since the ABL of the corresponding divided region is low, there may be characters or images that should be displayed in the divided region, even if the degree of the local dimming is large. That is, when the entire APL is low, high local dimming is applied and the entire image is displayed dark; therefore, even the characters or images to display may be displayed dark.

In this case, it is possible to implement color reproduction for the characters or images by improving the luminance level of the RGB signal transmitted to the display panel 210 while maintaining the reduction effect of the power consumed by the local dimming.

The pixel compensator 603 can compensate the image signal by multiplying the luminance level of the input RGB signal by a compensation value α, and for example, can estimate the compensation value α, using the APL of the entire image measured by the image analyzing unit 601.

Figure 17:
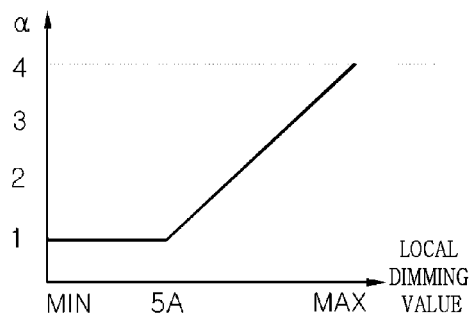
FIG. 17 is a graph showing an embodiment of a method of determining a compensating value of an image signal to the average luminance level of an image.

FIG. 17 is a graph showing an embodiment of a method of determining a compensating value α of an image signal to the average luminance level of an image.

Referring to FIG. 17, relatively large compensation can be performed when the image is dark, and the saturation frequency of the RGB value can be reduced by decreasing the compensation value α when the image is bright, such that more natural compensation can be performed to the pixel.

The x-axis represents the APL of the entire image measured by the image analyzing unit 601 and the y-axis represents a compensation value α for compensating the pixel of the RGB signal corresponding thereto, in the graph shown in FIG. 17.

That is, when the local dimming is not applied or the local dimming value is a predetermined reference value, for example, 5 A or less, the compensation value α for compensating the pixel is set to 1, and as the local dimming value becomes closer to the maximum value MAX, the compensation value α can be increased above 1. Therefore, the pixel can be compensated as much as the darkening of the substantially shown images of the characters or images by the local dimming.

Meanwhile, the compensated characters or images may imply regions where the gain of the RGB image signal is above a predetermined value.

According to another embodiment of the present invention, the controller 600 may further include a filtering unit (not shown) correcting the brightness level determined by the brightness determining unit 602, for example, in order to the brightness of the LED from rapidly changing with respect to time.

Figure 18:
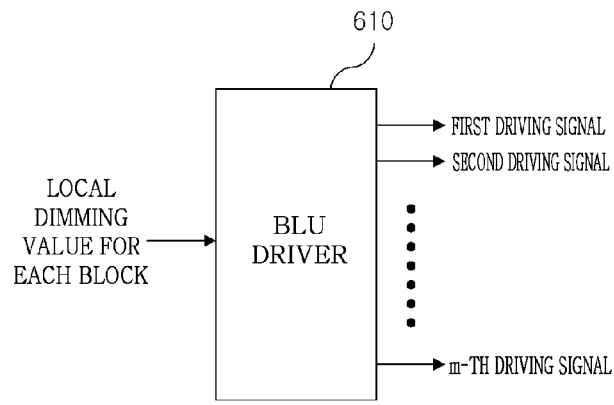
FIG. 18 is a block diagram schematically showing a configuration of a BLU driver.

FIG. 18 is a view showing the configuration of a BLU driver included in a display device, in which, in the operation of the BLU 610, the same parts as those described with reference to FIGS. 13 to 17 are not described below.

Referring to FIG. 18, the BLU driver 610 is inputted from local dimming values for each block representing the brightness of the divided blocks of the backlight unit 200 from the controller 600, in detail, the brightness determining unit 602 of the controller 600, and can output a plurality of driving signals, for example first to m-th driving signals, using the input local dimming values for each block.

Meanwhile, each of the driving signals outputted from the BLU driver 610 can control the brightness of two or more blocks of the divided blocks in the backlight unit 200.

In other words, the BLU driver 610 can create a first driving signal for controlling the brightness of n blocks, for example, the first to n-th blocks in the blocks of the backlight unit 200 and supply the first driving signal to the light sources pertaining to the first to n-th blocks, and for this configuration, it is possible to create the first driving signal, using the local dimming values corresponding to the first to n-th blocks in the local dimming values for each block inputted from the controller 600.

According to an embodiment of the present invention, the controller 600 and the BLU driver 610 can communicate signals with each other, using SPI (Serial Peripheral Interface) communication, that is, the BLU driver 610 can receive local dimming values for each block from the controller 600, using the SPI communication.

Figure 19:
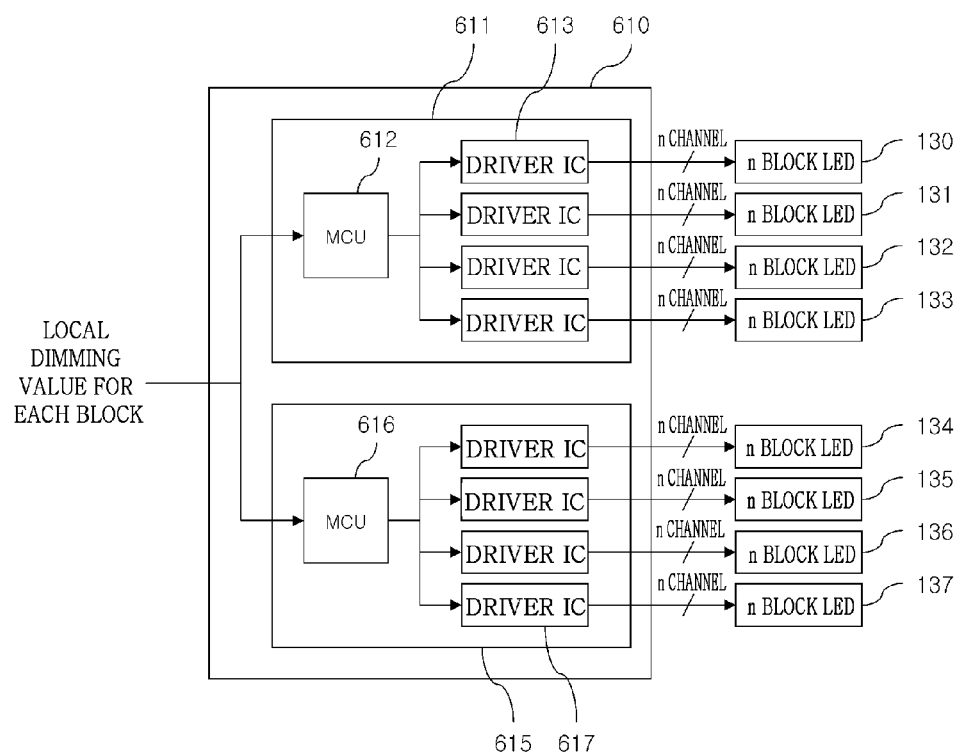
FIG. 19 is a block diagram showing an embodiment of the configuration of the BLU driver.

Referring to FIG. 19, the BLU driver 610 may include a plurality of driving units 611 and 615, and the driving units 611 and 615 may include MCUs 612 and 616 and a plurality of drivers IC 613 and 617, respectively.

For example, the first driving unit 611 includes an MCU 612 and a plurality of driver ICs 613, and the MCU 612 can receive in series local dimming values for each block from the controller 600, in detail the brightness determining unit 602 of the controller 600, and then output them in parallel and transmit local dimming values of corresponding blocks to the driver ICs 613.

Meanwhile, the driver ICs 613 can control the brightness of n blocks of the divided block in the backlight unit 200, and for this configuration, it is possible to output driving signals for controlling the brightness of the n blocks, using n channels.

For example, the first driving unit 611 may include four driver ICs 613 and each of the four driver ICs 613 can control the brightness of the light sources pertaining to sixty blocks by outputting driving signals, using sixty channels. Accordingly, the first driving unit 611 can control the brightness of 4×16 blocks, i.e. sixty four blocks in the divided blocks of the backlight unit 200.

For example, the second driving unit 615 includes an MCU 616 and a plurality of driver ICs 613, and the MCU 616 can receive in series local dimming values for each block from the controller 600, in detail the brightness determining unit 602 of the controller 600, and then output them in parallel and transmit local dimming values of corresponding blocks to the driver ICs 617.

Meanwhile, the driver ICs 617 can control the brightness of n blocks of the divided block in the backlight unit 200, and for this configuration, it is possible to output driving signals for controlling the brightness of the n blocks, using n channels.

The configuration of the BLU driver 610 shown in FIG. 19 is nothing but an embodiment of the present invention; therefore, a display device according to the present invention is not limited to the configuration shown in FIG. 19. That is, the BLU driver 610 may include three or more driving units, and the number of blocks of the backlight unit 200 of which the brightness is controlled by the driving units can be changed.

Although the present invention was described in the above with reference to the preferred embodiments, the embodiment are provided just as examples and do not limit the present invention. Further, the present invention may be modified and applied in various ways not exemplified in the above within the spirit and scope of the present invention by those skilled in the art. For example, the components described in detail in the embodiments of the present invention may be modified. Further, differences in the modification and application should be construed as being included in the scope of the present invention, which is defined in the accompanying claims.

What is claimed is:

1. A display device comprising:
   a backlight unit that is divided into a plurality of blocks and is driven by the divided blocks, and includes a plurality of optical assemblies;
   a display panel positioned over the backlight unit;
   a controller that outputs local dimming values corresponding to brightness of the blocks of the backlight unit, in accordance with an image displayed in the display panel; and
   a BLU driver that controls brightness of the blocks of the backlight unit using the local dimming values, wherein each of the plurality of optical assemblies includes:

a first layer;

a plurality of light sources that are formed on the first layer and emit light; and a reflective layer that is disposed above the first layer, wherein the BLU driver receives the local dimming values and outputs a plurality of driving signals, and the driving signals control the brightness of two or more blocks among the blocks of the backlight unit respectively, wherein each of the plurality of optical assemblies is combinable with the other, and the backlight unit is formed by combining the plurality of optical assemblies, and wherein a light emitting surface of one of the light sources is formed in a direction crossing the first layer, and at least two of the light sources emit light in different directions from each other.

2. The display device according to claim 1, wherein the display panel is divided into a plurality of regions and the controller adjusts the brightness of the blocks in the backlight unit which correspond to the regions, in accordance with luminance of the regions of the display panel.

3. The display device according to claim 2, wherein the controller includes:

an image analyzing unit that measures an average picture level of an image; and a brightness determining unit that determines the local dimming values for each block of the backlight unit, using the measured average picture level of the image.

4. The display device according to claim 3, wherein the brightness determining unit determines the brightness of a light source included in the blocks of the backlight unit which correspond to a first region, using the average picture level of the image and an average picture level of the first region in the display panel.

5. The display device according to claim 3, further comprising:

a pixel compensator that adjust a luminance level of an input image signal, using the measured average picture level of the image; and a panel driver that drives the display panel in response to the image signal outputted from the pixel compensator.

6. The display device according to claim 1, wherein the BLU driver receives the local dimming values for each block from the controller, using SPI (Serial Peripheral Interface) communication.

7. The display device according to claim 1, wherein the first layer is a substrate with the light sources mounted thereon.

8. The display device according to claim 1, wherein the each of the plurality of optical assemblies further includes a second layer disposed above the first layer to cover the light sources, and wherein the second layer includes silicon-based or acryl-based resin.

9. The display device according to claim 1, wherein the each of the plurality of optical assemblies further includes a second layer disposed above the first layer to cover the light sources, and wherein the second layer includes a plurality of dispersed particles.

10. The display device according to claim 1, wherein the each of the plurality of optical assemblies further includes a second layer disposed above the first layer to cover the light sources, and wherein the display device further comprises light-shielding patterns that are formed on the second layer to correspond to positions of the light sources.

11. The display device according to claim 10, wherein at least one of the light-shielding patterns has a reflectance that decreases outwardly from a portion of the at least one of the light-shielding patterns corresponding to a center portion of a corresponding light source.

12. The display device according to claim 10, wherein a center of at least one of the light-shielding patterns is disposed a predetermined distance from a center of the corresponding light source in a first direction.

13. The display device according to claim 1, wherein the each of the plurality of optical assemblies further includes a second layer disposed above the first layer to cover the light sources, and wherein the second layer is 0.1 to 4.5 mm thick.

14. The display device according to claim 1, wherein the light sources included in the each of the plurality of optical assemblies are driven in two or more divided blocks.

15. The display device according to claim 1, wherein the light sources included in a first light source array and a light sources included in the second light source array emit light in different directions from each other.

16. The display device according to claim 1, wherein the each of the plurality of optical assemblies further includes a second layer disposed above the first layer to cover the light sources, wherein the display device further comprises at least one reflection layer between the first layer and the second layer, and wherein the reflection layer includes at least a first portion and a second portion having different reflectances.

17. The display device according to claim 16, further comprising:

a plurality of patterns formed on the reflection layer, wherein the reflection layer includes an area in which a density of the patterns increases.

18. A display device, comprising:

a backlight unit that is divided into a plurality of blocks and is driven by the divided blocks, and includes a plurality of optical assemblies;

a display panel positioned over the backlight unit;

a first controller that outputs local dimming values corresponding to brightness of the blocks of the backlight unit, in accordance with an image displayed in the display panel; and a BLU driver that controls brightness of the blocks of the backlight unit using the local dimming values, wherein each of the plurality of optical assemblies includes:

a first layer;

a plurality of light sources that are formed on the first layer and emit light; and a reflective layer that is disposed above the first layers, wherein the BLU driver includes a driving unit, and the driving unit includes a second controller that receives local dimming values from the first controller and a plurality of driver ICs that output driving signals for controlling the brightness of the two or more blocks respectively, wherein each of the plurality of optical assemblies is combinable with the other, and the backlight unit is formed by combining the plurality of optical assemblies, and wherein a light emitting surface of one of the light sources is formed in a direction crossing the first layer, and at least two of the light sources emit light in different directions from each other.

19. The display device according to claim 18, wherein the second controller outputs the local dimming values inputted in parallel, and then transmits the local dimming values for each block to the driver ICs.

20. The display device according to claim 18, wherein the driver ICs transmit driving signal to the light sources included in n blocks, using n channels, and n represents a number.

21. The display device according to claim 18, wherein the BLU driver includes a plurality of the driving units.

22. The display device according to claim 18, wherein the light sources included in the each of the plurality of optical assemblies are driven in two or more divided blocks.

* * * * *